United States Patent [19]
Matlin et al.

[11] Patent Number: 4,966,631
[45] Date of Patent: Oct. 30, 1990

[54] SUPPORT FOR PHOTOVOLTAIC ARRAYS

[75] Inventors: Ronald W. Matlin, Lexington, Mass.; Richard K. Lenskold, Flemington, N.J.; Anand Rangarajan, Lexington, Mass.

[73] Assignee: Chronar Corp., Princeton, N.J.

[21] Appl. No.: 322,628

[22] Filed: Mar. 13, 1989

[51] Int. Cl.[5] .................................. H01L 31/042
[52] U.S. Cl. .................................. 136/244; 136/251; 437/2
[58] Field of Search ............... 136/244, 246, 248, 251, 136/291; 437/2-5

[56]        References Cited
         FOREIGN PATENT DOCUMENTS 61-287277 12/1986 Japan .................................. 136/244
62-208676  9/1987 Japan .................................. 136/244

OTHER PUBLICATIONS

G. Grassi, Proceedings, 4th E. C. Photovoltaic Solar Energy Conf., (1982), Reidel Pub. Co., pp. 248-257.

Primary Examiner—Aaron Weisstuch
Attorney, Agent, or Firm—George E. Kersey

[57]         ABSTRACT

A supported photovoltaic array and method in which support elements are in rows spaced from one another and are bi-directionally spanned by members which mount photovoltaic modules that are separated from one another and are secured to the spanning members by cushioned load-spreading attachments positioned in the spaces between adjacent modules.

20 Claims, 6 Drawing Sheets

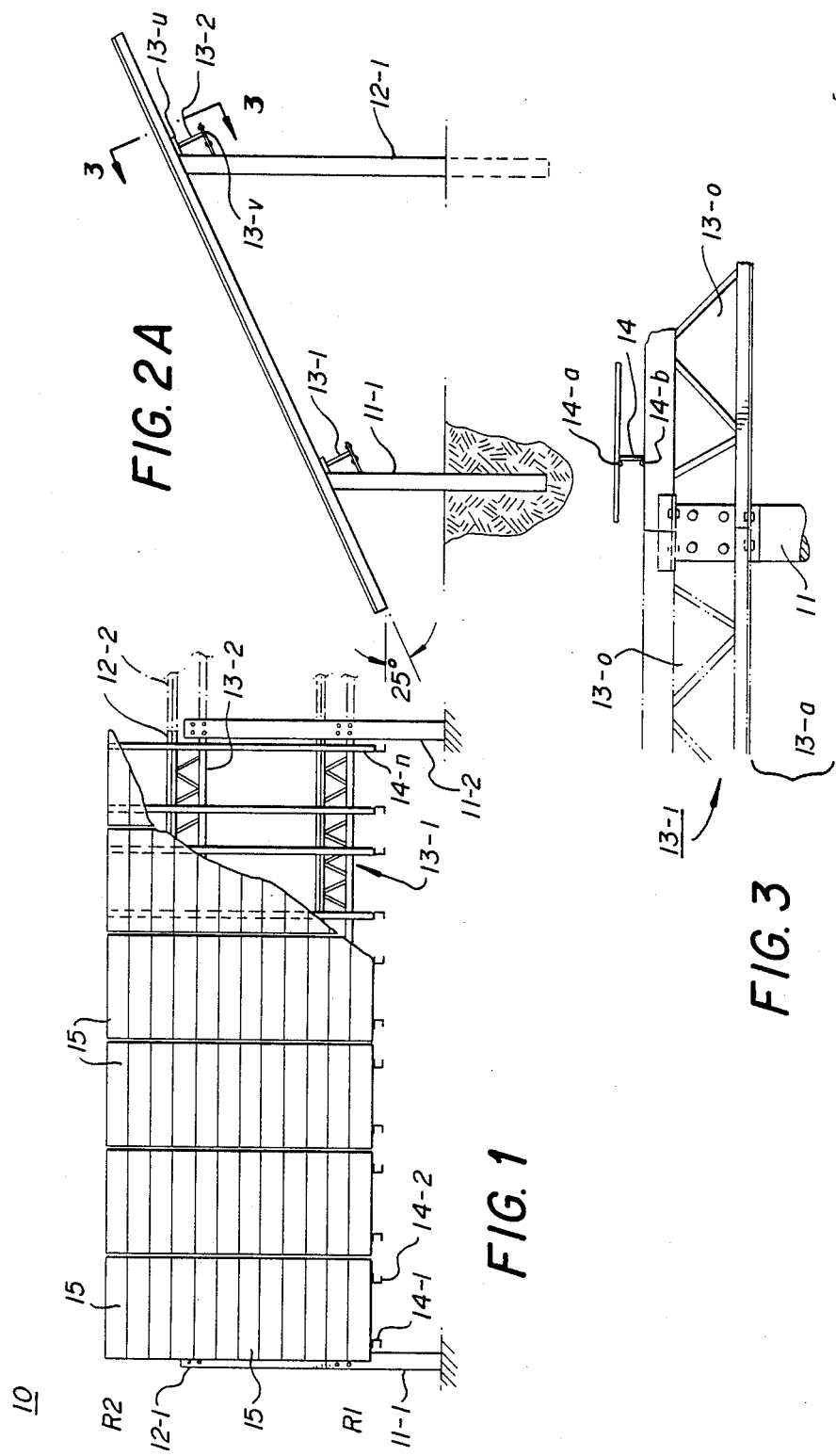

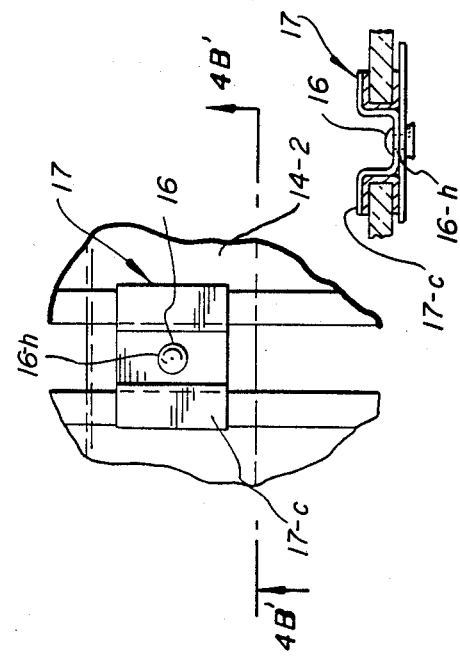
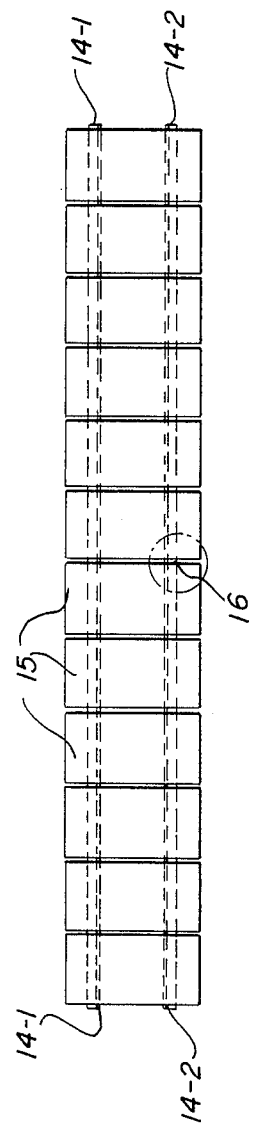
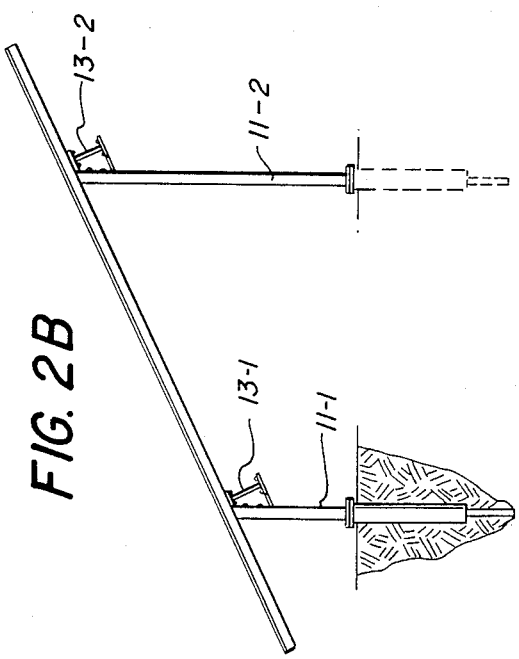

SUPPORT FOR PHOTOVOLTAIC ARRAYS

BACKGROUND OF THE INVENTION

This invention relates to photovoltaic arrays and more particularly to support systems for such arrays.

Photovoltaic arrays include a large number of solar panels which are arranged to provide electric power. This is accomplished by the conversion to electricity of light incident upon the panels.

Significant technological progress that has been made in the production of panels, accompanied by increased efficiency and significant reductions in cost. It now appears that a major cost element involved in the establishment of a wide-scale photovoltaic array is the cost of the support structure that is used to mount the panels of the array in proper position for receiving and converting solar energy.

Many different arrangements have been proposed and some have been implemented experimentally. In general, these support systems are so costly and mechanically complicated that they have seriously hindered the widespread introduction of photovoltaic arrays for the generation of commercial and industrial electricity.

As a result of the cost and mechanical complexity of existing arrays, there has been widespread reluctance to proceed with photovoltaic power systems, despite their obvious advantages in terms of desired environmental effects and conservation of petrochemicals which are more appropriately used for commercial and industrial products, instead of being wasted by burning.

Accordingly, it is an object of the invention to facilitate the low cost and mechanically simple construction of photovoltaic arrays. A related object is to achieve photovoltaic support systems that are competitive with the cost of generating electric power by conventional methods.

Another object of the invention is to simplify the construction of photovoltaic arrays so that construction companies, without specialized engineering skills, will be able to construct photovoltaic arrays and thus facilitate their introduction into the commercial power grid as a significant source of electricity.

SUMMARY OF THE INVENTION

In accomplishing the foregoing and related objects the invention provides a support system for a photovoltaic array in which a first row of support elements is set in the earth and is accompanied by a second row of support elements set in the earth.

A plurality of first members span the support elements either in a row or in a column. When there are two rows of support elements, each column contains only two such elements. A second plurality of members spans the first members and a set of photovoltaic modules is mounted on each pair of second members. At least one module is secured to the second member by at least one cushioned, load spreading attachment.

In accordance with one aspect of the invention each load spreading attachment is a rivet with an enlarged head having an area which is at least three times the cross-sectional area of the rivet stem. The ratio of head area to cross-sectional area desirably is about 25:1.

In accordance with another aspect of the invention the support elements of the first and second rows are desirably of wood and are advantageously wooden piles. In addition, the first members that span the support elements are advantageously open-webbed joists. Each joist can be formed by an upper flange, a lower flange and a lattice structure in between. In particular, the second member can be a rail formed from sheet metal with at least two bends. Such rails can have a "U" form or a "Z" form. In addition, the bent portions of each rail contact respectively the first members and the photovoltaic modules.

In accordance with a further aspect of the invention each attachment is accompanied by a load-spreading washer. A load-cushioning material can be interposed between each attachment and module and the load cushioning material is advantageously a polycarbonate.

In accordance with a method of practicing the invention a support system for a photovoltaic array is provided by setting a first row of support elements in the earth with each element extending vertically upwards.

A second row of support elements is also set in the earth spaced from the first row. This is followed by providing a plurality of reinforcement members and connecting the upper ends of the support elements of each row by a reinforcement member. The reinforcement members are in turn spanned by a plurality of photovoltaic support members that are used to mount photovoltaic modules. The latter are attached to the support members by load-spreading fasteners.

In accordance with one aspect of the method, the load-spreading fasteners are cushioned. In addition, the load-spreading fasteners are advantageously cushioned by placing a cushioning material between each fastener and the surface of an associated photovoltaic panel.

In accordance with a further aspect of the method, the support elements are driven into the earth, for example, by a pile driver. Alternatively, the support elements can be set in augered holes and tamped.

DESCRIPTION OF THE DRAWINGS

Other aspects of the invention will be apparent after considering several illustrative embodiments of the invention, taken in conjunction with the drawings in which:

FIG. 1 is a front view of a photovoltaic support system in accordance with the invention;

FIG. 2A is a partial sectional view of the support system of FIG. 1 showing support elements and first members;

FIG. 2B is a partial sectional view of an alternative support system in accordance with FIG. 1;

FIG. 3 is a cross-sectional view showing laterally extending support members for the system of FIG. 1;

FIG. 4A is an enlarged partial view showing the attachment of panels to the support system of FIG. 1 using cushioned, load spreading fasteners;

FIG. 4B is a cross-section through a load spreading attachment shown in FIG. 3A;

DETAILED DESCRIPTION

Figure 5A:
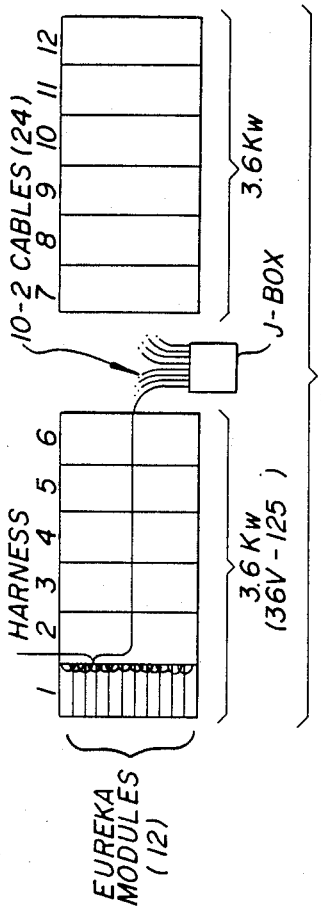
FIG. 5A is a diagram showing the arrangement of photovoltaic strings and their interconnection in accordance with the invention.

With reference to the drawings, a support system 10 for a photovoltaic array in accordance with the invention includes a first row R1 of support elements 11-1 and 11-2. The array of FIG. 1 includes only two support elements in the first row. When the array of FIG. 1 is associated with adjoining arrays, the first row R1 will include "n+1" support elements depending on the number of arrays. As shown, each of the support elements is a wooden pile which has been driven into the ground, or installed in an augered hole and then tamped into position. While wooden members are particularly desirable, it will be appreciated that other materials may be used as well. Examples includes pre-cast concrete and metallic elements.

Beyond the first row R1 is a second row R2 of support elements 12-1 and 12-2. It will be appreciated that each row will include further support elements associated with adjoining arrays and that further rows (not shown) of support elements may be included as well.

For each of the rows R1 and R2 of support elements 11 and 12, there is a member 13 that spans the elements of that row. Thus the elements 11-1 and 11-2 are spanned by a joist 13-1. Similarly the elements 12-1 and 12-2 are spanned by a joist 13-2. When there are additional arrays with additional support elements 12-m through 12-n they can be spanned by individual joists, or the joists 13 can be extended to span all or part of the elements in each row.

The joists 13-1 and 13-2 form two supports of a frame for solar modules 15. The mounting frame for the modules 15 is completed by rails 14-1 through 14-n. While there is a separate rail for each opposed pair of support elements, additional or fewer rails may be used as well. In the particular embodiment of FIG. 1, the rail spacing is governed by the width of the individual solar modules 15.

Once the rails 14 are in place, the solar modules 15 are fastened to the rails to form a panel constituted by a plurality of modules. The modules are fastened by any suitable devices, for example cushioned fasteners 16, as illustrated in FIGS. 4A and 4B. Each fastener 16 extends between adjoining modules into an associated rail. As described in more detail below, each fastener has an enlarged head 16-h which bears against a cushioning material 17 that spans adjoining modules. Since the modules typically have a glass substrate with deposited conductive and photovoltaic materials, it is surprising and unexpected that the modules 15 could be secured in the fashion provided by the invention. It would ordinarily be expected that the pressure exerted by the fasteners would crack the modules. This does not happen in accordance with the invention because of the combined effect of the load spreading heads of the fasteners and the use of a suitable cushioning material 17.

In FIGS. 4A and 4B the cushioning material is a retaining clip 17-c. This clip is advantageously made of a flexible material such as a polycarbonate plastic in order to provide the desired cushioning.

Connections of the solar modules 15 in the array 10 is made in conventional fashion. For simplicity in designating a particular module, row and column designations are used. Thus the module in the third laterally extending row and the fifth longitudinally extending column is designated "15-3, 5", where "15" is the module designation and the suffix "3, 5" indicates the 3rd row and 5th column. It is to be noted that the row and column designations of the modules 15 are different than those of the support elements 11 and 12.

Specific constructional features of the array 10 are illustated in FIGS. 2A through 5B.

As indicated in FIGS. 2A and 3, the joists 13 have an upper flange 13-u, a lower flange 13-r and an open web 13-o. In particular, as indicated in FIG. 3 the web 13-o has a lattice structure. The lattice is particularly suitable in reducing the weight of the joists while at the same time preserving its structural rigidity. In addition, as indicated in FIGS. 2A and 3, the end of the joists 13 that is secured to an adjoining element 11 is held in position by a support angle bracket 13-a. The particular angle bracket 13-a shown in FIG. 3 provides support not only for the joists 13-1 of the depicted array, it also provides support for a joist of an adjoining array.

While the rails 14 of FIG. 3 are "U" shaped with ends 14-a and 14-b, respectively positioned on an adjoining joist and solar panel, it will be appreciated that each rail 14 may have other forms, for example a "Z" cross section where the ends are positioned as shown in FIG. 3, but the web extends diagonally instead of vertically between the adjoining structural elements. A "Z" shaped rail is desirable in simplifying the construction of the array since no particular attention is required in relation to the positioning of the rail on the joists, as long as the end members of the rails are in contact with the joists.

It is to be noted, as shown in FIG. 2A, that the array is mounted at an angle with respect to the surface of the earth. In particular an angle of about 25° has been found to be particularly suitable for receiving an appropriate amount of solar energy as the position of the sun changes with respect to the earth.

While the panel string of FIG. 4 has been mounted longitudinally, i.e., extending upwardly with respect to the underlying frame in FIG. 1, it will be appreciated that the string may also be mounted laterally, with the support rails parallel to the surface of the earth and nonintersecting. In that case, the joists 13-1 and 13-2 of FIG. 1, which span the support elements in a row, are repositioned to span the support elements in a column. As a result, the joists 13-1 will extend between support elements 11-1 and 12-1, while the joist 13-2 will extend between support elements 11-2 and 12-2. The rails 14 will now extend between the joist 13-1, spanning elements 11-1 and 12-1, and the joist 13-2, spanning the elements 11-2 and 12-2. In relation to the scale of the array 10 shown in FIG. 1, this modification will require extending the rails and the number of panels in order to provide an appropriate overall length that can span between the two joists.

The reasons that the strings are adapted to be mounted either longitudinally or laterally is that shadow effects can otherwise produce discontinuities in the circuitry of the strings. In effect, the panels in each string are series connected. If a shadow falls on one of the panels it will have the effect of deadening that string and producing the equivalent of an open circuit. Thus, if there are shadows that extend laterally, the strings will be arranged so that the shadows are in line with the interconnect and consequently cannot produce disablement of the overall string. Otherwise, the strings can be arranged longitudinally, as shown in FIG. 1, so that if any shadows occur they should extend along the direction of the rails and thus avoid disablement of any one string.

Figure 5B:
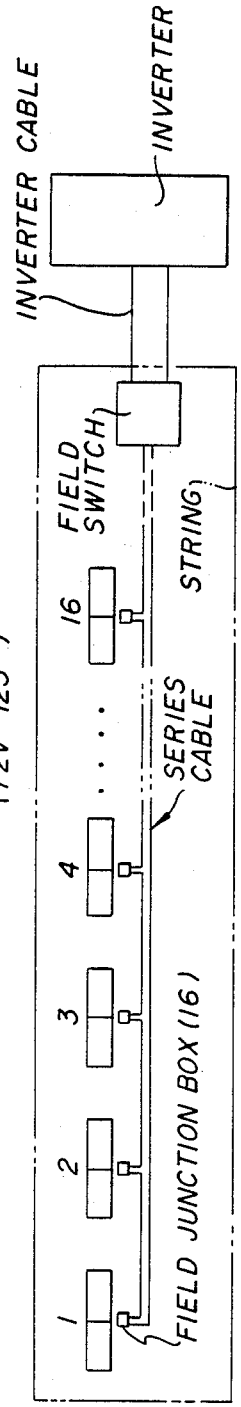
FIG. 5B is a diagram showing the relationship between photovoltaic strings and their interconnections.
Figure 5B:
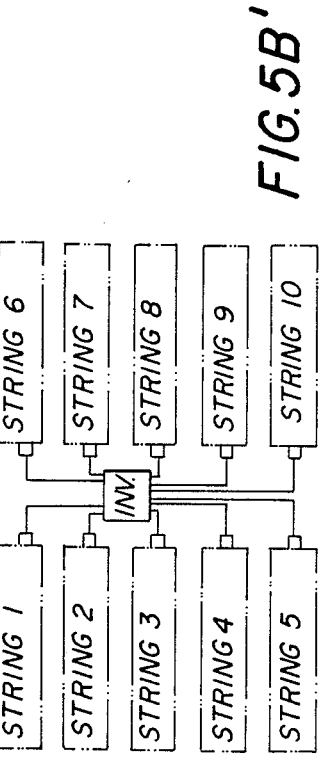

Interconnect arrangements for support systems of the kind shown in FIG. 1 are illustrated in FIGS. 5A and 5B. In a specific embodiment 12 modules are mounted to form a panel and six panels are mounted to form a string sub-section. Each string sub-section contains 72 modules.

The basic mounting scheme of the invention is characterized by the mounting of multiple modules on pairs of formed galvanized sheet metal channels which lay across steel joists. This provides a basic array that is designated as a string sub-section. Each string sub-section can be supported at each of its four corners. Galvanized steel ground anchors and wooden pilings can be used. The anchors are set in the ground without the need for concrete.

The structural elements are designed to withstand high wind loads characteristic of open solar suitable terrain that is common in such states as California, Nevada and Arizona.

The rails are formed as channels by passing pregalvanized sheet metal through dies and punching needed attachment holes. An appropriate material is 16 gauge steel.

The support for the rails by the joists is by steel members positioned with a nominal 25 per cent margin from the ends of the channels.

Where the string subsections are supported by anchors of the kind shown in FIG. 2, the anchors are used with helix disks. Alternatively, wooden poles are either driven into the ground or are set in the ground and tamped. An advantage provided by the wooden poles is that risers are not needed.

With respect to the electrical wiring, a harness is used to connect six modules in parallel to a dual parallel cable. The latter connects the harness to a field junction box. In a tested embodiment, twelve cables of various lengths in a group were connected in parallel at a junction box to produce typically a peak power output of 3600 watts at 36 volts and 8.33 amperes.

The 12 parallel cables from each of two sub arrays are joined in series in a junction box. A dual blocking diode prevents reverse bias of the solar modules which are joined to the series cable. This produces a doubling of the peak power output to 7200 watts at 72 volts and 100 amperes.

A cable connects the junction boxes in series and the end of each string of 16 field junction boxes is terminated with a safety switch. This allows the field to be shorted for repair, test and maintenance. The cable is required for series connection of the field boxes. The peak power output becomes 1.15 megawatts (from ten times 115 kilowatts). The voltage is 1,150 at 100 amperes.

The input cable from the field terminates in a direct current distributor panel. A series fused disconnect switch is included with each string along with series and shunt diodes.

Figure 6A:
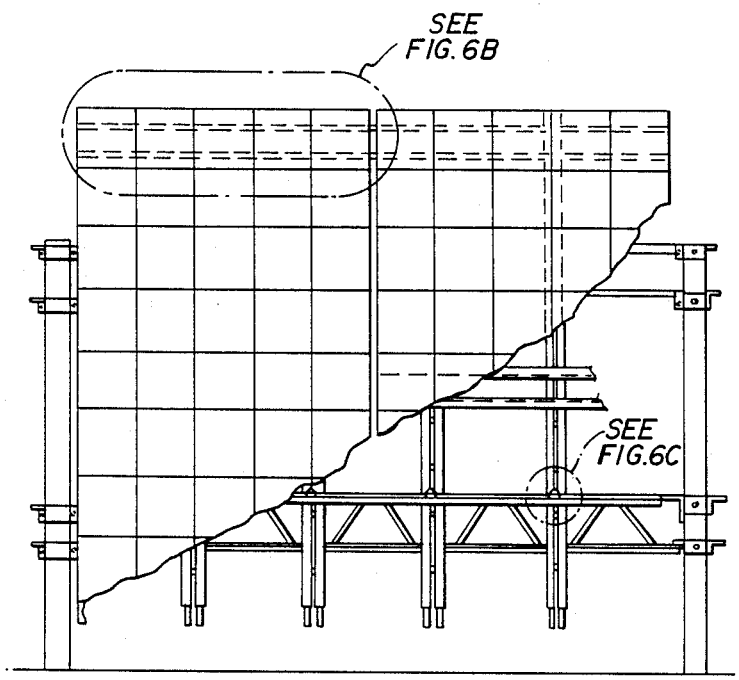
FIGS. 6A–6D are views of an alternative support system in accordance with the invention.
Figure 6B:
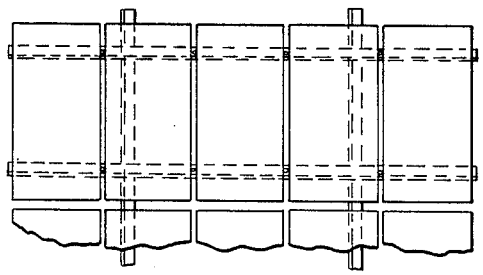

Another embodiment of the invention is illustrated in FIGS. 6A-6D. The modules are series-connected horizontally, with ten modules per string shown in FIG. 6A. A detail for five series-connected modules is shown in FIG. 6B. The modules are joined by a simple two-connector harness and a series diode (not shown) is included in each string within a connector. The diode illustratively rated at 3 amperes and 1,000 volts prevents reverse strain in the array when there is shadowing or field shorting.

Figure 6D:
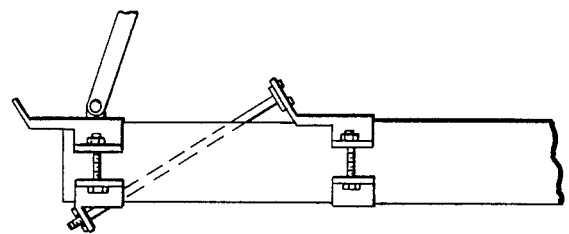
Figure 6C:
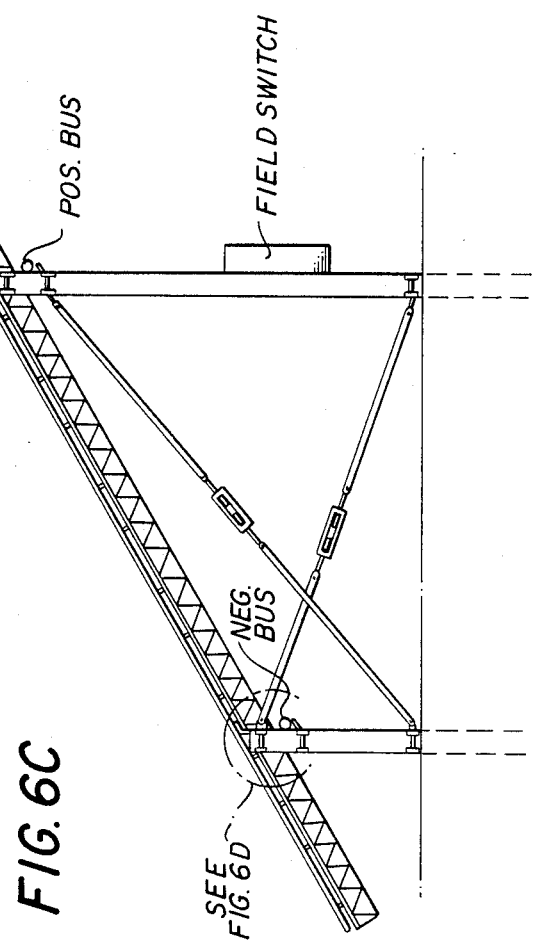

Eight strings in parallel connection are shown in FIG. 6A forming a section. A side view in FIG. 6C illustrates the location of a field switch for the array as well as cross-connected stabilization cables for the support poles. Each stabilization cable is adjusted to proper tautness by a turnbuckle.

In addition, each joist is positioned to resist the vertical component of wind force which is exerted against the faces of the modules. The mounting of the joist in relation to the adjoining support pole is illustrated in FIG. 6D.

Figure 7A:
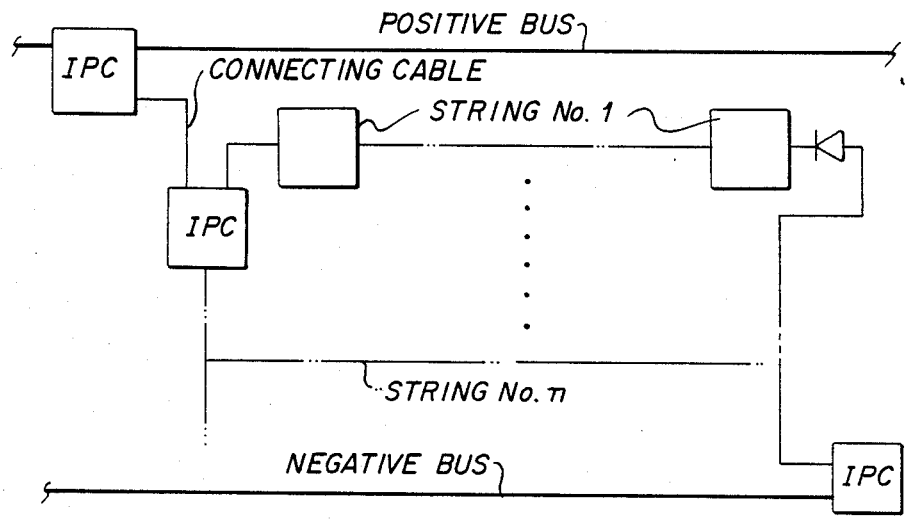
FIG. 7A is a connection diagram illustrating the use of insulating piercing connectors (IPC's) in accordance with the invention.
Figure 7B:
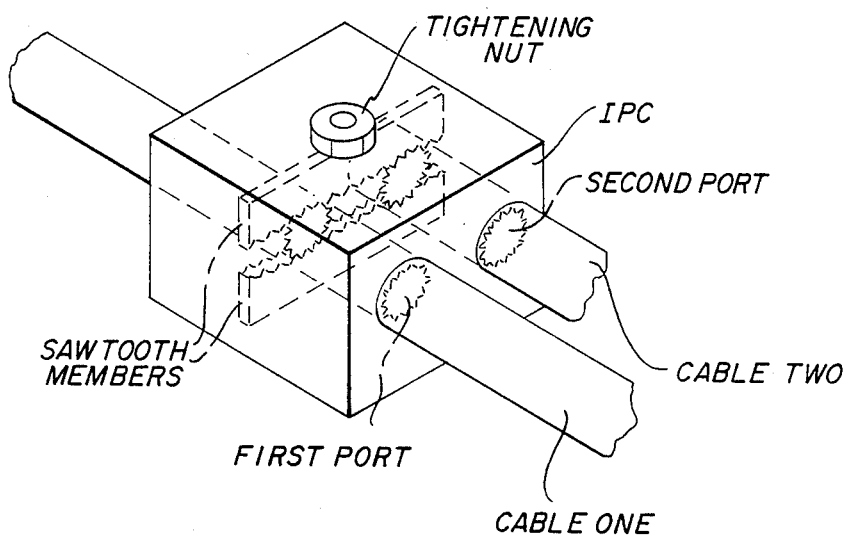
FIG. 7B is a perspective view of an insulation piercing connector used in FIG. 7A for practicing the invention.

Connection to the main cable is by an insulation piercing connector of the type shown in FIG. 7. The use of this type of connector eliminates the need for field junction boxes. For the insulation piercing connector of FIG. 7, there are first and second ports for respective cables. Each port contains sawtooth members that are drawn towards one another by the tightening of the nut and bolt connection that extends through the center of the connector. The saw tooth members of each port are joined to one another conductively so that when the cable members are inserted into the first and second ports, and the nut and bolt connection is tightened, the teeth in the ports pierce insulation of the two cables and provide a conductive connection.

It will be understood that the foregoing Detailed Description is illustrative only and that other forms of the invention, including equivalence, will be readily apparent to those of ordinary skill in the art.

What is claimed is:

1. A supported photovoltaic array comprising
a first row of support elements set in the earth;
a second row, spaced from said first row, of support elements set in the earth;
a plurality of first members, each spanning a plurality of said support elements;
a plurality of second members spanning said first members; and
a set of photovoltaic modules mounted on each pair of said second members, with each module separated from an adjacent module, with each adjacent pair of modules being secured to an underlying second member by at least one cushioned, load-spreading attachment positioned in the spaces between adjacent pairs of modules.

2. The system of claim 1 wherein each load-spreading attachment is a rivet with an enlarged head having an area which is at least three times the cross-sectional area of the rivet stem.

3. The system of claim 2 wherein the ratio of head area to cross sectional area is about 25:1.

4. The system of claim 1 wherein the support elements of said first and second rows are wooden piles and said modules have glass substrates.

5. The system of claim 1 wherein said first members span support elements in rows or in columns and said modules are retained by clips.

6. The system of claim 5 wherein said first members are open-web joists and said clips are polycarbonate plastic.

7. The system of claim 6 wherein each joist is formed by an upper flange, a lower flange and a lattice structure in between.

8. The system of claim 1 wherein each second member is a rail formed from sheet metal with at least two bends.

9. The system of claim 8 wherein the modules are connected to form panels and the panels are included in sections and are electrically connected to a main bus by insulation piercing connectors.

10. The system of claim 9 wherein the bent portions of each rail contact respectively the first members and photovoltaic modules and each insulating-piercing connection includes saw-tooth members that are drawable towards one another with conductors there between.

11. The system of claim 1 wherein each attachment is accompanied by a load spreading washer positioned below the surfaces of adjacent modules.

12. The system of claim 11 wherein a load cushioning material which spans adjoining modules is interposed between each attachment and its underlying second member.

13. The system of claim 12 wherein the load cushioning material is a polycarbonate.

14. The method of providing a support system for a photovoltaic array, which comprises the steps of
  (1) setting a first row of support elements in the earth with each element extending vertically upward;
  (2) setting a second row of support elements in the earth displaced from said first row;
  (3) providing a plurality of reinforcement members and connecting the upper ends of adjoining support elements by a reinforcement member;
  (4) spanning the reinforcement members by a plurality of support members;
  (5) mounting a plurality of spaced apart photovoltaic modules separated from one another on said photovoltaic support members; and
  (6) attaching said separated photovoltaic modules to said support members by load-spreading fasteners positioned in the spaces between adjacent pairs of modules.

15. The method of claim 14 wherein said load-spreading fasteners are cushioned by spanning adjoining modules.

16. The method of claim 15 wherein said load-spreading fasteners are cushioned by placing a material between each fastener and the surfaces of adjoining photovoltaic modules.

17. The method of claim 14 wherein said support elements are driven into the earth.

18. The method of claim 14 wherein said support elements are set in augered holes and tamped.

19. The method of claim 14 wherein said reinforcement members connect support elements in either a row or a column and mount separated modules.

20. The method of generating electricity which comprises the steps of:
  (a) providing support elements for a photovoltaic array;
  (b) mounting said photovoltaic array on said support elements;
  (c) fastening individual modules of said array to the support members by cushioned load spreading fasteners positioned in the spaces between adjacent pairs of modules; and
  (d) interconnecting the, separated modules of said array to produce electricity in response to illumination of the modules of said array by solar energy.

* * * * *